3,468,872
PHTHALIMIDE DYES OF THE MONOAZO SERIES
Ernst Schefczik, Ludwigshafen (Rhine), Germany, assignor to Badische Anilin- & Soda-Fabrik Aktiengesellschaft, Ludwigshafen (Rhine), Rhineland, Pfalz, Germany
No Drawing. Filed Aug. 16, 1966, Ser. No. 572,666
Claims priority, application Germany, Aug. 21, 1965,
B 83,374, B 83,375; June 25, 1966, B 87,724
Int. Cl. C09b 29/36
U.S. Cl. 260—152                                5 Claims

ABSTRACT OF THE DISCLOSURE

Azo dyes containing an amino group which bears a phthalimide-4-carboxylic acid radical, the dye being free of sulfonic acid groups. The dyes are particularly useful as disperse dyes for dyeing polyester and polyamide textile materials.

---

The present invention relates to new dyes having the general formula:

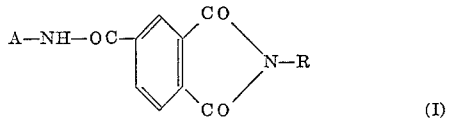

in which A denotes the radical of an azo dye which is free from sulfonic acid groups and R denotes a hydrocarbon radical having two to eighteen carbon atoms and which may bear alkoxy groups, phenoxy groups, hydroxy groups, cyano groups, carbalkoxy groups, dialkylamino groups or chlorine atoms as substituents.

These dyes are valuable disperse dyes which are outstandingly suitable for dyeing synthetic textile material.

Azo dyes having the Formula I include compounds having the general formula:

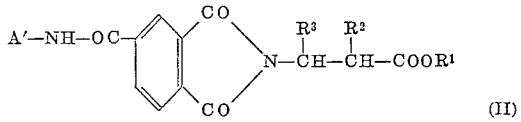

in which A' denotes the radical of an azo dye which is free from sulfonic acid groups, $R^1$ denotes an unsubstituted or substituted hydrocarbon radical which is free from sulfonic acid groups, and the radicals $R^2$ and $R^3$ denote hydrogen atoms, methyl groups or ethyl groups.

The new dyes having the Formula I are obtained by reacting an azo dye or an intermediate for an azo dye, which contains at least one primary amino group but no sulfonic acid groups, while acylating an amino group, with an acid halide having the general formula:

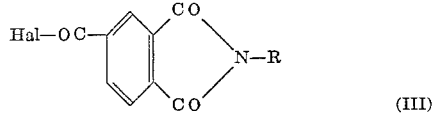

Hal denoting a chlorine or bromine atom and the radical R has the above meaning and, when an azo dye intermediate has been used, completing the formation of the azo dye in conventional manner.

The starting dyes for the production of the new azo dyes are mainly monoazo dyes, but polyazo dyes, such as disazo and trisazo dyes, may also be used. They contain the amino groups (reactable with the acid halides having the general Formula III) attached to the dye radical either directly or via a bridging group, such as an alkyl radical or alkylamino radical, and the amino groups may be present in the coupling component or in the diazo component.

The dye radicals may contain, in addition to the amino groups to be reacted, other amino groups or other radicals (excluding sulfonic acid groups), for example low molecular weight alkyl groups, such as methyl groups, ethyl groups or butyl groups; aryl radicals, such as phenyl radicals; low molecular weight alkoxyl groups, such as methoxyl groups or ethoxyl groups; halogen atoms, such as chlorine atoms or bromine atoms; amino groups, which may be unsubstituted or may bear one or two alkyl radicals, such as methyl radicals, cyano-ethyl radicals or butyl radicals, as substituents; acylamino groups, such as acetylamino groups or benzoylamino groups; lactam groups; cyano groups; nitro groups; trifluoromethyl groups; sulfonamide groups; carboxylic amide groups and alkylsulfone groups.

The following azo dyes are suitable as starting materials for the new process: 4-amino-4'-nitroazobenzene, 4-amino-2'-hydroxy-5'-methylazobenzene, 4-amino-2'-hydroxy-4',5'-dimethylazobenzene, 4-amino-4'-ethylhydroxyethylaminoazobenzene and 4-amino-2'-methyl-4'-dihydroxyethylaminoazobenzene.

As intermediates for azo dyes both diazo components and coupling components are suitable. Completion of the dye from a diazo component acylated according to this invention is carried out by diazotization and coupling with a coupling component free from sulfonic acid groups, and from a coupling component acylated according to this invention by coupling with a diazonium compound free from sulfonic acid groups. The diazo components to be used contain not only the amino groups for reaction with the acid halides having the general Formula III, but also a diazotizable amino group. Instead of the diazotizable amino group, however, they may also contain an amino group protected by a formyl group, or a nitro group. In the former case, the formyl group is converted by acids into the amino group before or during the diazotization and in the latter case the diazotizable amino group is obtained from the nitro group by reduction.

The acid halides having the general Formula III necessary for the production of the new dyes may be obtained from the corresponding phthalimide-4-carboxylic acids by the usual methods, for example by reaction with thionyl halides, such as thionyl chloride or thionyl bromide. They may be used in pure crystallized form or in the form of the solutions obtained in their production. It is preferred to use the acid chlorides.

R in the general Formula III of the acid halides denotes an aliphatic hydrocarbon radical having at least two carbon atoms and which may be substituted and/or may contain heteroatoms. These aliphatic hydrocarbon radicals may be linear, branched or cyclic and may contain substituents such as halogen atoms, aryl groups or carboxylic ester groups. The said aliphatic hydrocarbon radicals may however also contain heteroatoms, such as oxygen atoms or nitrogen atoms.

For example the radical R may denote the following radicals: ethyl, n-propyl, isopropyl, n-butyl, isobutyl, tertiary-butyl, amyl, 2-ethylhexyl, decyl, stearyl, carbethoxymethyl, 2-chloroethyl, 2-acetoxyethyl, 3-methoxypropyl, 3-ethoxypropyl, 3-diethylaminopropyl, 3-cyclohexyloxypropyl, —(CH$_2$)$_3$OCH$_2$OC(CH$_3$)$_3$, cyclohexyl, benzyl, phenylethyl, hexahydrophenylethyl and tetrahydrofurfuryl-(2).

The reaction of the said starting materials containing amino groups with the acid halides is advantageously carried out in a solvent at temperatures of 0° to 200° C. A molar amount or slightly more than a molar amount of the acid halide having the Formula III is used with reference to the starting dye. Organic solvents which do not react in an undesirable way with the starting materials are suitable as solvents; examples are benzene, toluene, xylene, chlorobenzene, dichlorobenzenes, trichlorobenzenes, nitrobenzene, naphthalene, pyridine, chloroform, tetrachloroethane, tetrahydrofuran, dioxane, dimethylformamide and N-methylpyrrolidone. Mixtures of these solvents may also be used.

The reaction for the production of the new dyes may be carried out for example by stirring the starting materials in one of the said solvents. It is advantageous to work under reflux at the boiling point of the solvent. The dyes usually crystallize out from the reaction mixture upon cooling and in some cases even at the reaction temperature. Quantitative separation may be completed by adding a second solvent, such as methanol, ethanol, or cyclohexane. It is also possible to remove the solvent from the reaction mixture by steam distillation. Reaction mixtures which contain pyridine, dimethylformamide or other solvents which are miscible with water, may be worked up by introducing the reaction mixture into water.

The new dyes having the Formula II are prepared for example by reacting an azo compound or an intermediate for an azo compound which contains the group:

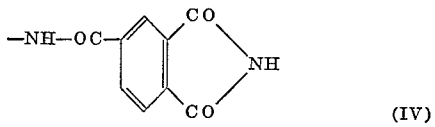

but does not contain any sulfonic acid groups, while alkylating the nitrogen atom of the phthalimide group, with a carboxylic ester having the general formula:

$$R^3—CH=CHR^2—COOR^1 \quad (V)$$

in which $R^1$, $R^2$ and $R^3$ have the above meanings, and when using an intermediate for an azo compound, completing formation of the azo dye in the usual way.

The azo compounds to be used as starting materials for the production of the new dyes having the Formula II contain an amino group bearing the phthalimide-4-carboxylic acid radical as substituent but no sulfonic acid groups. Examples of such compounds are the azo compounds having the general formula:

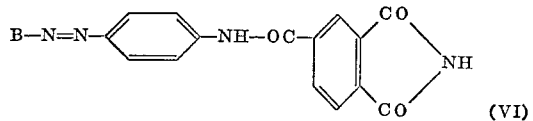

in which B denotes the radical of a coupling component free from sulfonic acid groups, for example of the benzene, naphthalene, acetoacetic anilide or pyrazolone series. For example the starting materials having the Formula VI may contain the following radicals B:

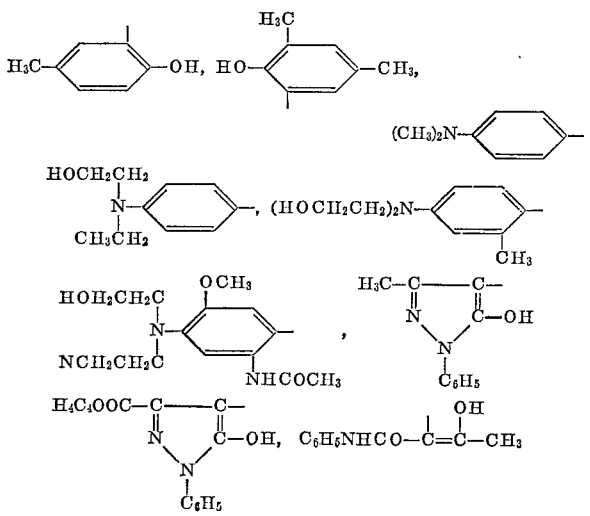

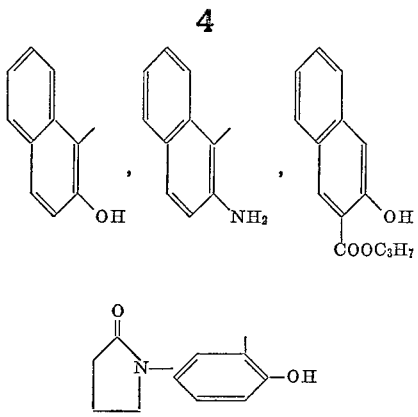

In the production of the new azo dyes having the Formula II it is also possible to start from intermediates for the production of azo compounds, i.e. particularly diazo components or coupling components which after alkylation of the nitrogen atom of the phthalimide group (for example by diazotization and coupling with a coupling component or by coupling with a diazotized diazo component) are completed to the new azo dyes, the starting materials being free from sulfonic acid groups. The azo compounds (or intermediates for the production of azo compounds) may easily be prepared for example by reaction of phthalimide-4-carboxylic chlorides with azo compounds (or their intermediates) which contain an acylatable amino group and are free from sulfonic acid groups.

Esters of acrylic acid and methacrylic acid are particularly suitable as $\alpha,\beta$-unsaturated carboxylic esters having the Formula V. The radical $R^1$ may denote for example an alkyl radical having one to sixteen carbon atoms, such as a methyl, ethyl, propyl, isopropyl or isobutyl radical; or an aralkyl radical, such as a 2-phenylethyl radical, and these radicals may also bear halogen atoms, hydroxy groups, ether groups, such as methoxy groups, ethoxy groups or phenoxy groups, acetoxy groups, nitrile groups or secondary or tertiary amino groups, as substituents. The following specific carboxylic esters are given by way of example: methyl acrylate, ethyl acrylate, isobutyl acrylate, methyl methacrylate, ethyl methacrylate or isobutyl methacrylate, 2-hydroxyethyl acrylate, 2-methoxyethyl acrylate, 2-butoxyethyl acrylate, 4-hydroxy-n-butyl acrylate, 4-chloro-n-butyl acrylate, 2-hydroxy-3-chloropropyl acrylate, 2-ethyl-n-hexyl acrylate, 2-phenylethyl acrylate, 2-diethylaminoethyl acrylate or 2-cyanoethyl acrylate.

The azo compounds (or the intermediates for the production of azo compounds) may be reacted with the carboxylic esters having the general Formula VI for example by heating at least a molar amount (on the azo compound or azo intermediate) of carboxylic ester in a solvent or diluent at temperatures of up to 150° C., preferably 70° to 100° C. The solvent or diluent may be for example an indifferent polar organic solvent, such as benzonitrile, nitrobenzene, dimethylformamide, N-methylpyrrolidone, dimethylacetamide, dimethyl sulfoxide or tetramethylurea.

It is advantageous to react the starting materials in the presence of alkaline reagents to accelerate the alkylation. Suitable alkaline reagents are inorganic bases, such as potassium hydroxide, sodium hydroxide, potassium carbonate or sodium carbonate, and organic bases, such as sodium methylate, potassium tertiary-butylate or tetraalkyl ammonium hydroxides. They are advantageously used in amounts of about 0.5 to 5% by weight on the azo compound.

It is advantageous to add a small amount of a polymerization inhibitor, such as hydroquinone, to prevent polymerization of the $\alpha,\beta$-unsaturated carboxylic ester during the reaction. The new dyes are outstandingly suitable as disperse dyes for dyeing synthetic textile material. They may also be used as pigment dyes. They are however particularly suitable for dyeing polyester or polyamide textile material. Dyeings having good light fastness and excellent thermal resistance are obtained on these materials with the dyes obtainable according to this invention. In these coloristic properties they are far superior to dyes which contain for example an amino group bearing a benzoyl group as substituent instead of amino groups acylated by phthalimide-4-carboxylic acid.

The invention is illustrated by the following examples. The parts specified in the examples are parts by weight unless otherwise stated. Parts by volume bear the same relation to parts by weight as the liter to the kilogram.

EXAMPLE 1

24.2 parts of 4-amino-4'-nitroazobenzene, 300 parts by volume of toluene and 29 parts of N-butylphthalimide-4-carboxylic chloride are boiled together under reflux for two hours. The dye begins to separate out even at the boiling point. It is suction filtered at 60° to 70° C., washed with methanol and dried. 41 parts of orange brown crystals are obtained having a melting point of 227° to 228° C. The dye has the constitution:

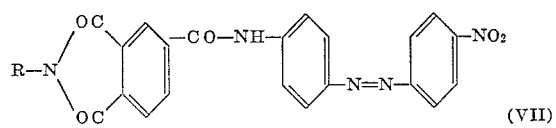

(in which R denotes $C_4H_9$) and dyes polyethylene terephthalate cloth orange shades having very good heat resistance.

EXAMPLE 2

The N-butylphthalimide-4-carboxylic chloride in Example 1 is replaced by the equivalent amount of N-(3-methoxypropyl)-phthalimide-4-carboxylic chloride. A dye having the constitution VIII in which R denotes the $CH_3OCH_2CH_2CH_2$-radical is obtained having a melting point of 246° C.

EXAMPLE 3

22.7 parts of 4-amino-2'-hydroxy-5'-methylazobenzene, 250 parts by volume of benzene and 30 parts of N-(3-methoxypropyl) - phthalimide-4-carboxylic chloride are boiled together under reflux for four hours. 100 parts by volume of ethanol is then added, the whole is allowed to cool and the yellow crystalline compound is suction filtered, washed with ethanol and dried. 42 parts of dye is obtained which has a melting point of 220° C. and the constitution:

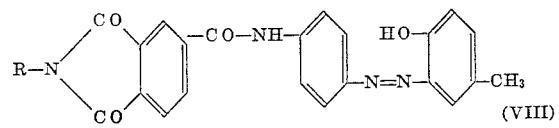

(R denoting $CH_3OCH_2CH_2CH_2$—).

The yellow dyeings obtained with this dye on polyethylene terephthalate cloth have excellent light fastness and fastness to heat setting.

The following yellow dyes having the constitution VIII in which R has the meaning given are obtained analogously:

| Example No. | R | Prepared in— | Melting point in ° C. |
|---|---|---|---|
| 4 | $C_2H_5$— | Xylene | 269 to 270. |
| 5 | n-$C_3H_7$— | Toluene | 240 to 241. |
| 6 | n-$C_4H_9$— | Benzene | 229. |
| 7 | i-$C_4H_9$— | ___do___ | 254 to 255. |
| 8 | i-$C_5H_{11}$— | ___do___ | 230 to 231. |
| 9 | $CH_3(CH_2)_3CHCH_2$— $\|$ $C_2H_5$ | Toluene | 224 to 225. |
| 10 | n-$C_{18}H_{37}$— | ___do___ | 192 to 193. |
| 11 | $ClCH_2CH_2$— | Chlorobenzene | 229 to 230. |
| 12 | $C_2H_5OCOCH_2$— | ___do___ | 228 to 229. |
| 13 | $C_2H_5O(CH_2)_3$— | Toluene | 197 to 198. |
| 14 | $C_6H_5CH_2CH_2$— | Chlorobenzene | 273 to 274. |

EXAMPLE 15

29.3 parts of the azo dye having the constitution:

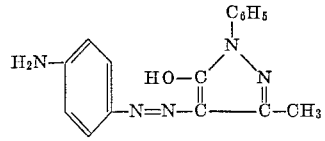

200 parts by volume of benzene and 28 parts of N-propylphthalimide-4-carboxylic chloride are boiled together under reflux for four hours. The whole is then diluted with 200 parts by volume of methanol and allowed to cool and the residue is suction filtered and dried. 41 parts of a dye having the constitution:

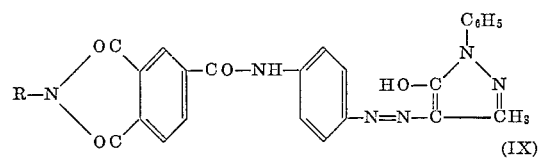

(R denoting $C_3H_7$) is obtained having a melting point of 263° C. (with decomposition). It dyes polyester cloth bright yellow shades having good light fastness and fastness to heat setting.

The following yellow dyes having the constitution IX in which R has the meaning given are obtained by replacing the acid chloride of Example 15 by the appropriate acid chlorides:

| Example No. | R | Prepared in— | Melting point in ° C. (with decomposition) |
|---|---|---|---|
| 16 | n-$C_4H_9$— | Benzene | 270 |
| 17 | i-$C_4H_9$— | Toluene | 275 |
| 18 | i-$C_5H_{11}$— | ___do___ | 249–250 |
| 19 | $CH_3O(CH_2)_3$— | ___do___ | 242 |
| 20 | $C_2H_5O(CH_2)_3$— | ___do___ | 231 |
| 21 | $C_2H_5OCOCH_2$— | Chlorobenzene | 283 |
| 22 | $C_4H_9OCOCH_2CH_2$— | Xylene | 310 |
| 23 | $C_6H_5CH_2CH_2$— | Chlorobenzene | 266–267 |

EXAMPLE 24

26.3 parts of the azo dye having the constitution:

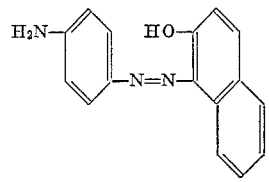

200 parts by volume of pyridine and 30 parts of N-(3-methoxypropyl)phthalimide - 4 - carboxylic chloride are boiled together for one hour. The reaction mixture is then poured into water and the deposited dye is suction filtered, washed with hot ethanol, and dried. 48 parts of a dye having the constitution:

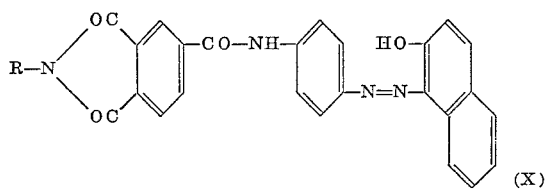

(R denoting $CH_3OCH_2CH_2CH_2$—) and a melting point of 224° to 226° C. is obtained. It dyes polyethylene terephthalate cloth bright scarlet red shades having good resistance to heat.

The following red dyes are obtained in a similar way; they have the constitution X in which R has the meaning indicated:

| Example No. | R | Prepared in | Melting point in ° C. |
|---|---|---|---|
| 25 | C₃H₇— | Dimethylformamide | 289 to 290. |
| 26 | n-C₄H₉— | Chlorobenzene | 248 to 249. |
| 27 | i-C₅H₁₁— | Dichlorobenzene | 255 to 256. |
| 28 | C₂H₅OCH₂CH₂CH₂— | Xylene | 224 to 225. |
| 29 | C₄H₉OCOCH₂CH₂— | Pyridine | 241 to 242. |

EXAMPLE 30

40 parts of the azo compound having the formula:

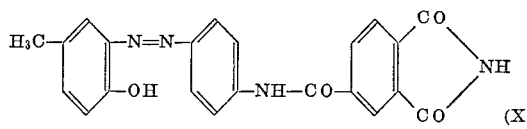

(XI)

is dissolved in 200 parts of dimethylformamide. The whole is stirred at 80° C. and then 0.1 part of hydroquinone, 50 parts of methly acrylate and 1.5 parts of finely powdered potassium carbonate are added. The mixture is stirred for another twelve hours at 80° C. and then poured into 1000 parts of methanol. The dye separates in crystalline form. It is suction filtered, washed with water and dried. 43 parts of dye having a melting point point of 230° C. from butanol is obtained. This dye has the formula:

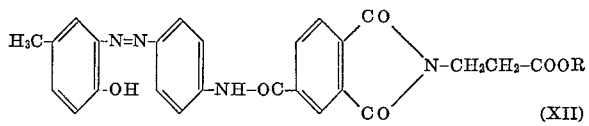

(XII)

in which R denotes methyl. It yields bright yellow dyeings having excellent fastness to light and heat setting on linear polyester cloth.

The azo compound used as starting material is obtained as follows: 227 parts of 4-amino-2'-hydroxy-5'-methylazobenzene is dissolved in 2250 parts of anhydrous chlorobenzene by heating. 211 parts of phthalimide-4-carboxylic chloride is added and the whole is boiled under reflux for two hours. The crystal suspension is suction filtered at 80° C., washed with ethanol and dried. 400 parts of the azo compound having the Formula XVI is obtained having a melting point of 349° C. (from nitrobenzene).

EXAMPLE 31

40 parts of the azo compound having the Formula XI is dissolved in 200 parts of N-methylpyrrolidone by heating. 0.1 part of hydroquinone, 60 parts of β-chloroethyl acrylate and a solution of 3 parts of trimethylbenzyl ammonium hydroxide in 10 parts of methanol are added in succession. The whole is stirred for twenty hours at 75° C. and then poured into 1200 parts of cold 1% hydrochloric acid. The yellow dye which flocculates out is suction filtered, washed with water and dried. 48 parts of dye having the Formula XIII is obtained (R denoting CH₂CH₂Cl); it has a melting point of 191° to 192° C. (from glacial acetic acid).

Dyes having the Formula XIII in which R has the meaning given in the following table are obtained from the compound having the Formula XI by the method described in Example 49 or 50 using the acrylic esters specified in the table: in the table column E gives the numbers of the examples, column R gives the meaning of R in the acrylic ester CH₂=CH—COOR, and MP gives the melting points in ° C. from the solvents indicated in brackets:

| E | R | Melting point |
|---|---|---|
| 32 | —C₂H₅ | 215 to 216 (acetic acid). |
| 33 | —C₄H₉ (normal) | 194 to 195 (butanol). |
| 34 | —C₄H₉ (iso) | 200 to 201 (acetic acid). |
| 35 | —C₄H₉ (tertiary) | 219 to 220 (acetic acid). |
| 36 | —CH₂CH₂OH | 187 to 188 (acetic acid). |
| 37 | —CH₂CH₂OCH₃ | 183 to 184 (acetic acid). |
| 38 | —CH₂CH₂OC₄H₉ | 164 to 165 (acetic acid). |
| 39 | —CH₂CH₂CH₂CH₂OH | 158 to 159 (butanol). |
| 40 | —CH₂CHCH₂CH₂CH₂CH₃<br>          \|<br>          C₂H₅ | 173 to 174 (butanol). |
| 41 | —CH₂CH₂C₆H₅ | 202 to 203 (acetic acid). |
| 42 | —CH₂CH₂OC₆H₅ | 213 to 214 (dichlorobenzene). |
| 43 | —CH₂CH₂Cl | 191 to 192 (acetic acid). |
| 44 | —CH₂CHOHCH₂Cl | 245 to 251 (acetic acid). |
| 45 | —CH₂CH₂CH₂CH₂Cl | 175 to 176 (acetic acid). |
| 46 | —CH₂CH₂CN | 202 to 203 (chlorobenzene). |
| 47 | —CH₂CH₂N(C₂H₅)₂ | 255 to 260 (acetic acid). |

The dyes of Examples 32 to 47 dye polyester cloth yellow shades having very good light fastness and fastness to heat setting.

EXAMPLE 48

40 parts of the the azo compound having the Formula XI is dissolved in 200 parts of N-methylpyrrolidone, then 0.1 part of hydroquinone, 50 parts of methyl methacrylate and 1 part of finely powdered potassium hydroxide are added, and the whole is stirred for twenty hours at 85° C. The solution is poured into 1000 parts of 0.5% cold sulphuric acid. The flocculated compound is suction filtered, washed with water and dried.

46 parts of a yellow dye having the formula:

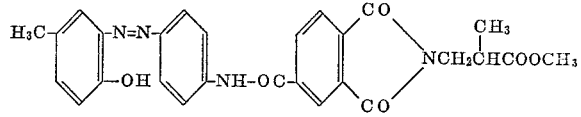

having a melting point of 225° to 226° C. (from acetic acid) is obtained. It dyes polyester cloth yellow shades having high light fastness and fastness to heat setting.

EXAMPLE 49

43.6 parts of the azo compound having the formula:

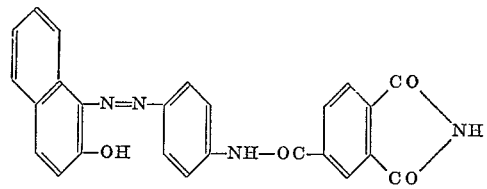

is dissolved in 320 parts of N-methylpyrrolidone with heating, and then 0.1 part of hydroquinone, 60 parts of butyl acrylate and 2 parts of finely powdered potassium carbonate are added to the solution. The whole is stirred for sixteen hours at 80° C. and the reaction mixture is poured into 1000 parts of methanol and 200 parts of water. The precipitated compound is suction filtered, washed with water and dried, 52 parts of a red dye having the formula:

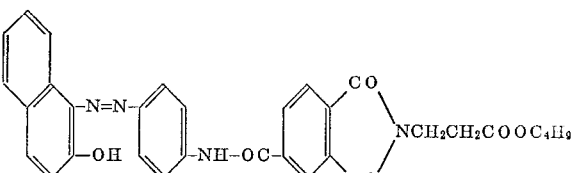

is obtained having a melting point of 241° to 242° C. (from dichlorobenzene). It dyes polyester cloth scarlet red shades having very good thermal resistance.

The azo compound used as starting material is prepared by a method analogous to that described in Example 30.

I claim:
1. An azo dye of the formula

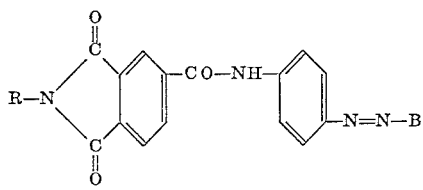

in which B denotes the radical of a coupling component free from sulfonic acid groups and selected from the class consisting of the benzene, naphthalene, acetoacetic anilide and pyrazolone series and R denotes a substituent of from 2 to 8 carbon atoms selected from the class consisting of alkyl, alkoxyalkyl, phenoxyalkyl, phenylethyl, hydroxyalkyl, chloralkyl, cyanoethyl, carbalkoxyalkyl and dialkylaminoalkyl.

2. The dye having the formula

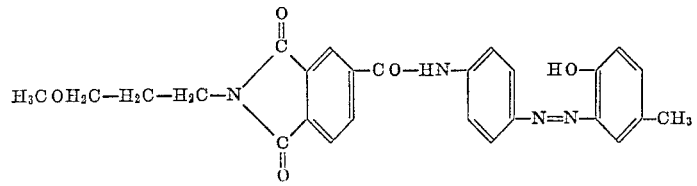

3. The dye having the formula

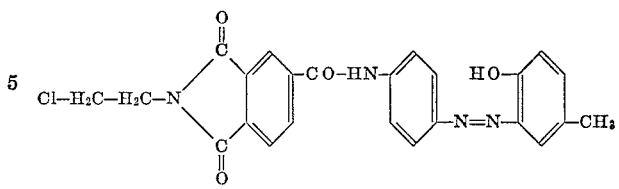

4. The dye having the formula

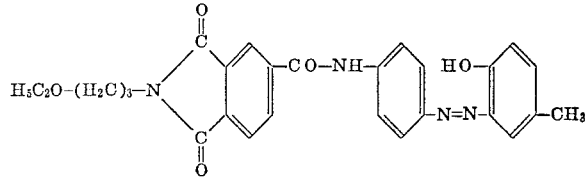

5. The dye having the formula

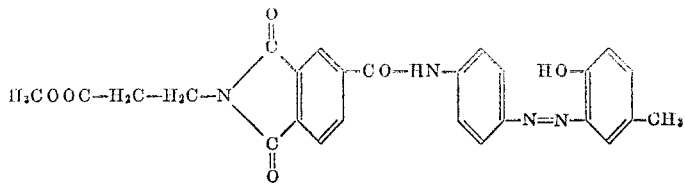

References Cited
UNITED STATES PATENTS 3,356,672  12/1967  Schefczik _____ 260—152

CHARLES B. PARKER, Primary Examiner

C. F. WARREN, Assistant Examiner

U.S. Cl. X.R.

8—41, 55; 260— 157, 162, 163, 197, 326